(12) United States Patent
Jagusch et al.

(10) Patent No.: US 10,359,235 B2
(45) Date of Patent: Jul. 23, 2019

(54) HEAT EXCHANGER ARRANGEMENT FOR A CARBON BLACK PRODUCTION PLANT

(71) Applicant: ARVOS GMBH, Kassel (DE)

(72) Inventors: Silke Jagusch, Leverkusen (DE); Jürgen Lauer, Duisburg (DE); Gregory Gene Homoki, Allison Park, PA (US); James Francis Geisler, Allison Park, PA (US)

(73) Assignee: ARVOS GMBH, Kassel (DE)

( * ) Notice: Subject to any disclaimer, the term of this patent is extended or adjusted under 35 U.S.C. 154(b) by 0 days.

(21) Appl. No.: 15/769,493

(22) PCT Filed: Oct. 21, 2016

(86) PCT No.: PCT/EP2016/075406
§ 371 (c)(1),
(2) Date: Apr. 19, 2018

(87) PCT Pub. No.: WO2017/068139
PCT Pub. Date: Apr. 27, 2017

(65) Prior Publication Data
US 2018/0306518 A1    Oct. 25, 2018

(30) Foreign Application Priority Data
Oct. 23, 2015   (DE) .................. 10 2015 220 742

(51) Int. Cl.
*B01J 19/00*   (2006.01)
*C09C 1/50*   (2006.01)
(Continued)

(52) U.S. Cl.
CPC ............ *F28D 7/103* (2013.01); *B01J 12/005* (2013.01); *B01J 19/0013* (2013.01); *C09C 1/50* (2013.01);
(Continued)

(58) Field of Classification Search
CPC ........ F28D 7/103; F28D 7/0066; F28D 7/106; B01J 12/005; B01J 19/0013; C09C 1/50; D28D 7/16
(Continued)

(56) References Cited

U.S. PATENT DOCUMENTS 3,147,084 A * 9/1964 Franzen ................... B01J 8/067
165/140
3,818,975 A * 6/1974 Tokumitsu .............. F22B 1/066
165/104.19
(Continued)

FOREIGN PATENT DOCUMENTS

DE    24 12 421 A1    9/1975
DE    31 36 860 A1    4/1982
(Continued)

OTHER PUBLICATIONS

Written Opinion of the International Search Authority dated Feb. 10, 2017 of corresponding International application No. PCT/EP2016/075406; 6 pgs.
(Continued)

*Primary Examiner* — Huy Tram Nguyen
(74) *Attorney, Agent, or Firm* — Maier & Maier, PLLC

(57) ABSTRACT

An industrial production plant including at least one reactor for producing a flue gas and including a heat exchanger system having a first heat exchanger section for heat exchange between the flue gas and a fluid and a second heat exchanger section for heat exchange between the flue gas and reaction air for the reactor, which can be preheated by the second heat exchanger section. The first heat exchanger section is configured as a double-tube heat exchanger with first tubes each arranged one-way in a respective first jacket tube, and the second heat exchanger section is configured as a tube bundle heat exchanger with a tube bundle of second
(Continued)

Figure 1:
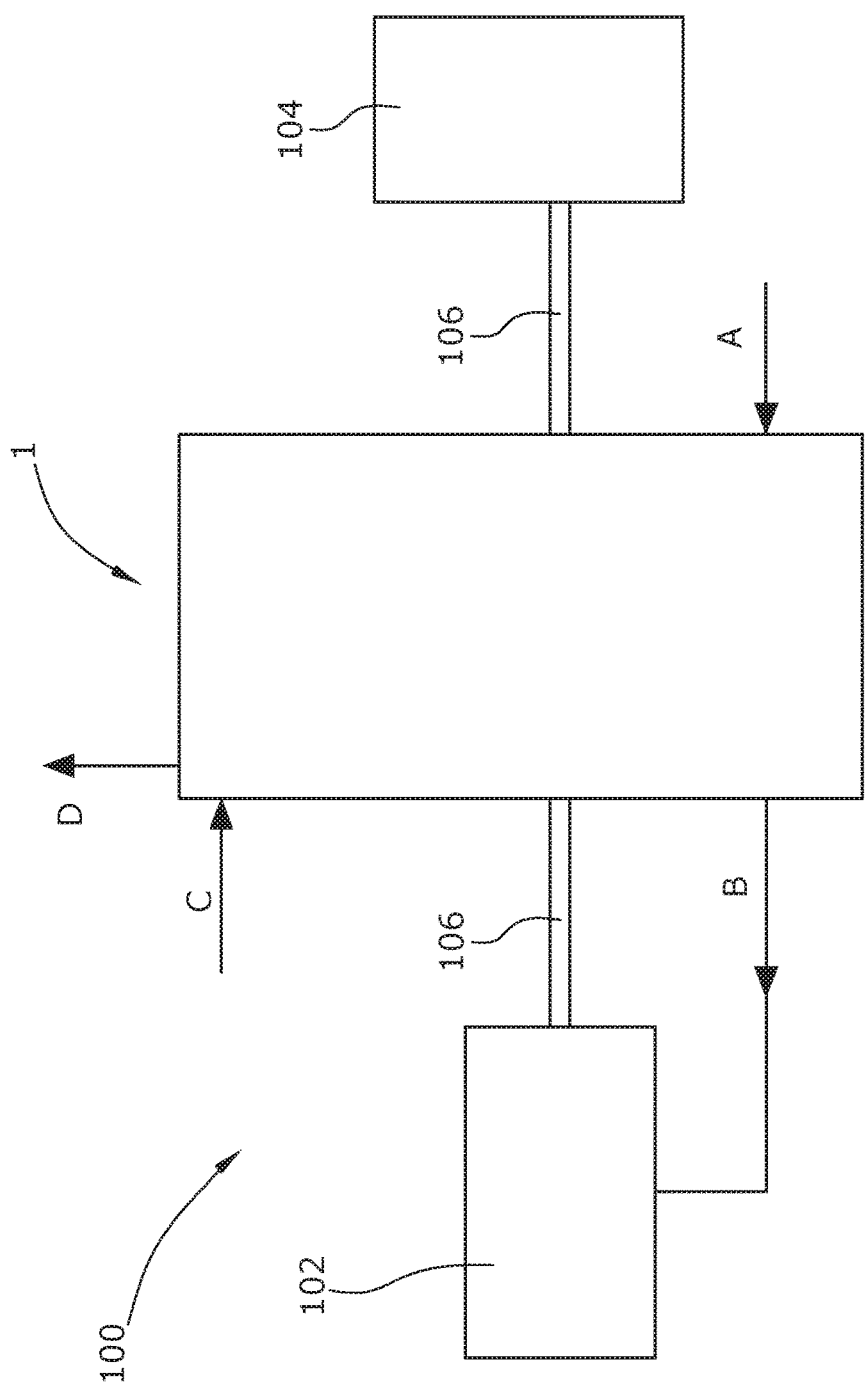

tubes arranged in a second jacket tube and each arranged one-way in the jacket tube.

10 Claims, 3 Drawing Sheets

(51) Int. Cl.
  *F28D 7/16*  (2006.01)
  *F28D 7/10*  (2006.01)
  *F28D 7/00*  (2006.01)
  *B01J 12/00*  (2006.01)
  *F28D 21/00*  (2006.01)
  *F28F 19/00*  (2006.01)

(52) U.S. Cl.
  CPC .......... *F28D 7/0066* (2013.01); *F28D 7/106* (2013.01); *F28D 7/16* (2013.01); *B01J 2219/00092* (2013.01); *F28D 2021/0024* (2013.01); *F28F 19/00* (2013.01); *F28F 2265/26* (2013.01)

(58) Field of Classification Search
  USPC ........................................................ 422/150
  See application file for complete search history.

(56) References Cited

U.S. PATENT DOCUMENTS

| | | | | |
|---|---|---|---|---|
| 4,221,763 A | * | 9/1980 | Greene | ............... B01J 3/04 |
| | | | | 165/158 |
| 5,595,242 A | * | 1/1997 | Jekerle | ............... F28D 7/106 |
| | | | | 165/154 |
| 2016/0282051 A1 | * | 9/2016 | Natarajan | ............... C09C 1/50 |

FOREIGN PATENT DOCUMENTS

| | | |
|---|---|---|
| DE | 33 12 791 A1 | 10/1984 |
| DE | 199 26 402 C1 | 11/2000 |
| DE | 698 06 931 T2 | 2/2003 |
| DE | 697 21 984 T2 | 2/2004 |
| DE | 10 2009 042507 A1 | 3/2011 |
| DE | 10 2010 006 370 A1 | 8/2011 |
| EP | 2 570 646 A1 | 3/2013 |
| WO | 2015/073614 A2 | 5/2015 |

OTHER PUBLICATIONS

International Search Report dated Feb. 10, 2017 of corresponding International application No. PCT/EP2016/075406; 5 pgs.

* cited by examiner

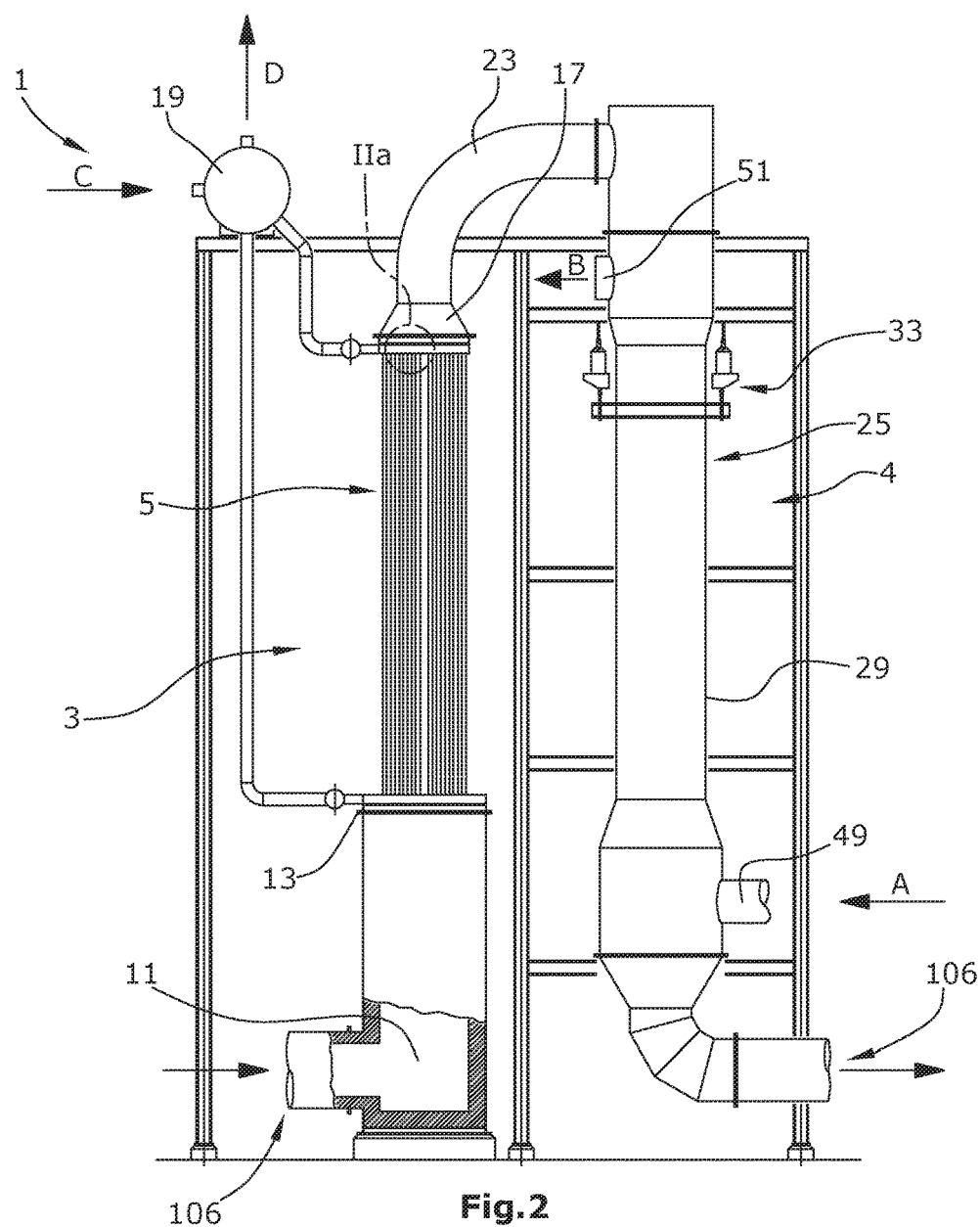
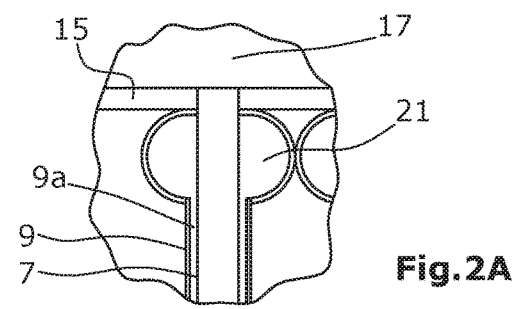
Fig. 2
Fig. 2A

HEAT EXCHANGER ARRANGEMENT FOR A CARBON BLACK PRODUCTION PLANT

The present invention relates to a carbon black production plant comprising at least one reactor for production of a flue gas and further comprising a heat exchange system.

Carbon black, also referred to as furnace black, is to be counted among the 50 most-produced chemicals worldwide. Normally, carbon black is produced in separate production plants. Carbon black production plants comprise a reactor in which natural gas or oil is burned incompletely while the resultant flue gas will then be filtered for separation of the carbon black. The reaction air used for the burning will in most cases be preheated before being supplied to the reactor. Mostly, for this purpose, the flue gas will, prior to filtration, be conducted through a heat exchanger wherein the reaction air will be preheated. By preheating the reaction air, the thermal efficiency of the carbon black production plant can be enhanced.

In the production of carbon black, the flue gas will in most cases be abruptly cooled by injection water, i.e. by so-called quenching. Thereby, it shall be safeguarded that the reaction process will be stopped and the carbon black contained in the flue gas will thus have the desired quality.

In recent years, it has been found that the cooling of the flue gas at the end of the carbon black production can also be effected in other ways, e.g. by heat exchange, without causing quality losses in the final product. Starting from this recognition, it is an object of the present invention to provide a carbon black production plant which has a high thermal efficiency and further is of a simple construction.

The carbon black production plant of the invention is defined by the features of claim 1.

The carbon black production plant of the invention comprises a reactor for producing a flue gas and a heat exchange system having a first heat exchange section for heat exchange between the flue gas and a fluid and a second heat exchange section for heat exchange between the flue gas and reaction air for the reactor. The reaction air can be preheated by means of the second heat exchange section. The first heat exchange section is designed as a double-tube heat exchanger comprising first tubes each arranged in a single-path configuration in a respective first casing tube, and the second heat exchange section is designed as a tube-bundle heat exchanger comprising a tube bundle which is arranged in a second casing tube and which includes second tubes each arranged in a single-path configuration in the casing tube. Said first and second tubes are adapted to have the flue gas flow through them. Said double-tube heat exchanger and said tube-bundle heat exchanger are arranged vertically, wherein the respective upper ends of the first and second tubes are connected to each other via a tube conduit. The flue gas will flow through the double-tube heat exchanger is an ascending direction and through the tube-bundle heat exchanger in a descending direction.

Providing such a heat exchange system in a carbon black production plant has proven to be particularly advantageous. Through the first heat exchange section, a fluid can be heated so that the thermal energy of the flue gas can be exploited in a favorable manner. For instance, the first heat exchange section can be designed as a vaporizer in which the fluid in the form of water is vaporized. The first heat exchange section can also have a cooling function for the flue gas that will enhance the conclusion of the reaction process in the production of carbon black. Thereby, some of the cooling devices of the reactor, such as e.g. injection nozzles for the so-called quenching, can be omitted. By making use of the waste heat, also the thermal efficiency of the carbon black production plant is increased. By the vertical arrangement of the tube-bundle heat exchanger for preheating the reaction air, it is achieved that an expansion of the tube bundles in the casing tube can occur in an advantageous manner. The heat transfer from the flue gas to air has the effect that, in the tube-bundle heat exchanger, a heat transfer will occur to a relatively warm, gaseous medium so that said second tubes will have a high temperature, inevitably resulting in a relatively soft material of the second tubes. A horizontal arrangement of the tube-bundle heat exchanger would unavoidably lead to problems due to sagging of the second tubes. By the vertical arrangement, this is prevented, at the same time allowing for a thermal expansion of the second casing tube and of the second tube in the vertical direction without problems. The double-tube heat exchanger, also arranged vertically, offers comparable advantages. By the provision of a tube conduit interconnecting the respective upper ends of the first and second tubes, it is further accomplished that the connection between the first and second heat exchange section can be kept relatively short. After flowing through the first heat exchange section, the flue gas still has a relatively high temperature so that high-grade tube conduits will have to be used for the connection between the first and second heat exchange sections. Thus, a short tube conduit connection between the first and second heat exchange sections as rendered possible by the invention, is advantageous for cost reasons. Further, the arrangement of the double-tube heat exchanger and of the tube-bundle heat exchanger as provided by the invention will allow them to be placed relatively closely to each other, resulting in a relatively modest space requirement for the heat exchanger system in the carbon black production plant.

Preferably, it is provided that the double-tube heat exchanger is designed as a natural circulation steam generator. Consequently, the fluid used will be water. The flue gas will heat the water in the double-tube heat exchanger, causing the water to evaporate. By the inventive arrangement of first tubes which are each arranged in the casing tubes, it is achieved that the water will flow around the first tubes in a relatively thin layer so that, by high energy input, the water can evaporate an advantageous manner. The water is conducted in parallel flow, thus advantageously allowing for a natural circulation in the double-tube heat exchanger. This obviates the need for complex appliances for pumping the water, such as e.g. circulation pumps, that would require higher expenditure for energy.

The double-tube heat exchanger can comprise a steam drum which in the conventional manner serves as a store, distributor and separator of water and steam. In other words, the steam drum will be supplied in a uniform manner with feed water, and the steam drum will also receive the steam generated in the double-tube heat exchanger. Preferably, the steam drum is arranged above the double-tube heat exchanger so that the water fed from the drum into the first casing tube will be subjected to a sufficient pressure for rising in the casing tubes up to the section in which an evaporation will occur, whereby the natural circulation is enhanced in a favorable manner.

It can be provided that the double-tube heat exchanger comprises a vertically standing first entry chamber for the flue gas that has connected to it the first tubes and is delimited by a first lower tube plate accommodating the first tubes. By means of said vertically standing first entry chamber, the flue gas can be distributed in a favorable manner into the individual first tubes.

Adjacent to the first lower tube plate, at least one inlet chamber for the fluid can be arranged that has the first casing tubes connected to it. Said at least one inlet chamber allow for an advantageous distribution of the fluid among the first casing tubes.

In the upper end of the casing tubes, the double-tube heat exchanger can comprise at least one outlet chamber which is entered by the first casing tubes. Said at least one outlet chamber will collect the fluid that has been heated and respectively evaporated in the casing tubes and will conduct the fluid e.g. to the steam drum. Further, adjacent to the at least one outlet chamber, a first upper tube plate can be provided for accommodating the first tubes. A collector tube for the flue gas can be arranged adjoining to said first upper tube plate, said collector tube merging into the tube conduit. The collector tube can be formed e.g. as a funnel tube.

It can also be provided that, on their lower ends, the first casing tubes widen into a respective inlet chamber for the fluid. In this case, it is preferably provided that these inlet chambers are connected to each other and form the first lower tube plate. Additionally or alternatively, it can be provided that the first casing tubes widen on their upper ends into respective outlet chambers for the fluid, these outlet chambers being preferably connected to each other and forming the first upper tube plate.

Preferably, it is provided that the tube-bundle heat exchanger is designed as a counterflow heat exchanger. In other words, this means that, while the second tubes have the flue gas flowing through them in downward direction, the second casing tube has the reaction air flowing through them in upward direction. Such a counterflow arrangement has proven to be of particular advantage for the preheating of the reaction air.

Preferably, it is provided that the tube-bundle heat exchanger is arranged in a suspended manner. Preferably, in this case, the tube-bundle heat exchanger is suspended via the second casing tube. Such an arrangement is particularly advantageous because thermal expansion of the tube-bundle heat exchanger and particularly of the second casing tube will occur in downward direction so that the upper end of the tube-bundle heat exchanger will substantially remain at the same site. Thus, problems which could occur by different expansions of the first heat exchange section and the second heat exchange section are avoided.

For the suspended arrangement of the tube-bundle heat exchanger, a mounting structure can be provided that engages on the second casing tube. Said mounting structure can be designed as a spring-type mounting structure wherein the weight of the tube-bundle heat exchanger is at least partially accommodated by a spring device of the spring-type mounting structure.

By the design of the mounting structure as a spring-type mounting structure, thermal expansion occurring in the first heat exchange section can be compensated for, which is the case because, during the expansion, the entire second heat exchange section will be taken along. This is possible because, in the spring-type mounting structure, a vertical movement is allowed in a predetermined extent.

Additionally or alternatively, the tube conduit connecting the first and second heat exchange sections can be designed to compensate only the thermal expansion generated in the first heat exchange section, e.g. with the aid of a corresponding compensator.

Preferably, it is provided that the tube-bundle heat exchanger comprises a vertically arranged second entry chamber for the flue gas, said chamber being arranged in an upper end section of the tube-bundle heat exchanger, having the second tubes connected thereto and being delimited by a second upper tube plate accommodating the second tubes. By means of the second entry chamber, the flue gas can be distributed in a favorable manner among the second tubes of the tube-bundle heat exchanger.

Preferably, it is provided that the second tubes are fastened by being suspended on the second upper tube plate. Thereby, it is achieved that also thermal expansion of the second tubes will occur in downward direction. For instance, each second tube can be provided with a suspension device by which each second tube is fastened to the second upper tube plate.

In this case, it is particularly provided that a second lower tube plate accommodates the lower ends of the second tubes, wherein the second tubes each comprise individual tube compensators for connection with the second lower tube plate. This makes it possible in an advantageous manner to compensate for thermal expansion without undesired deformation of the second tubes.

The second upper tube plate can be cooled. For instance, the second upper tube plate can be designed as a double bottom, with a cooling chamber formed internally thereof in abutment with it. Since the reaction air heated in the casing tube can reach very high temperatures of e.g. 800° C., it is advantageous to cool the second upper tube plate which is subjected both to the flue gas and to the preheated reaction air. By providing the second upper tube plate with said cooling chamber, this cooling effect can be achieved in an advantageous manner. The cooling chamber can comprise at least one and preferably a plurality of cooling fluid inlets and at least one cooling fluid outlet. As a cooling fluid, air can be used which will be supplied to the reaction air e.g. through the cooling fluid outlet.

In case of a suspended attachment of the second tubes to the second upper tube plate designed as a double bottom, the suspension devices can respectively be designed as tube sleeves fastened to the double bottom. Into these tube sleeves, the second tubes can be hung in a simple manner. The second tubes run through the cooling chamber. In order to avoid that the massively heated second tubes are directly exposed to the cooling fluid or that a strong temperature gradient is generated, said tube sleeves can enclose the second tubes in the area of the cooling chamber and perform an insulating function. Thus, the suspension devices formed as tube sleeves and the design of the second upper tube plate as a double bottom make it possible in an advantageous manner to suspend the second tubes on the hot end of the tube-bundle heat exchanger.

Further, the second lower tube plate can delimit an outlet chamber for the flue gas. In said outlet chamber, the flue gas flowing out from the second tubes will be collected and be led off for further processing. For instance, a separation device, e.g. a separator device, can be provided behind the second heat exchange section for separating the carbon black from the flue gas.

The invention can further advantageously provide that an inlet for the reaction air is arranged adjacent to the second lower tube plate, and/or an outlet for the reaction air is arranged adjacent to the second upper tube plate.

The tube conduit connecting the double-tube heat exchanger and the tube-bundle heat exchanger can be designed e.g. as a tube bend.

Further, arranging the tube-bundle heat exchanger in a vertical orientation, with the flue gas flowing through the tube-bundle heat exchanger in downward direction, has the advantage that, after passing through the tube-bundle heat exchanger, the flue gas can be laterally led off at the lower end of the tube-bundle heat exchanger. In conventional tube-bundle heat exchanger for the preheating of air wherein the flue gas is to flow through the heat exchanger in ascending direction, complex tube conduits are required which on the upper end of the heat exchanger have to be guided downward.

Figure 3A:
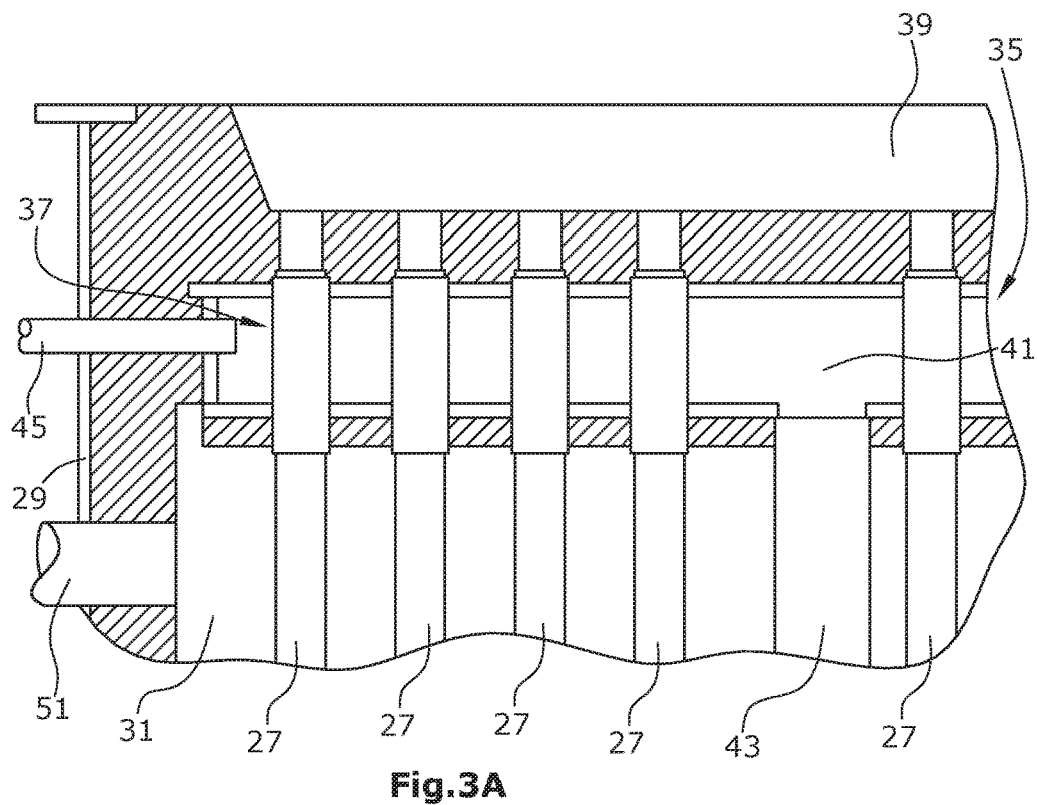
Figure 3B:
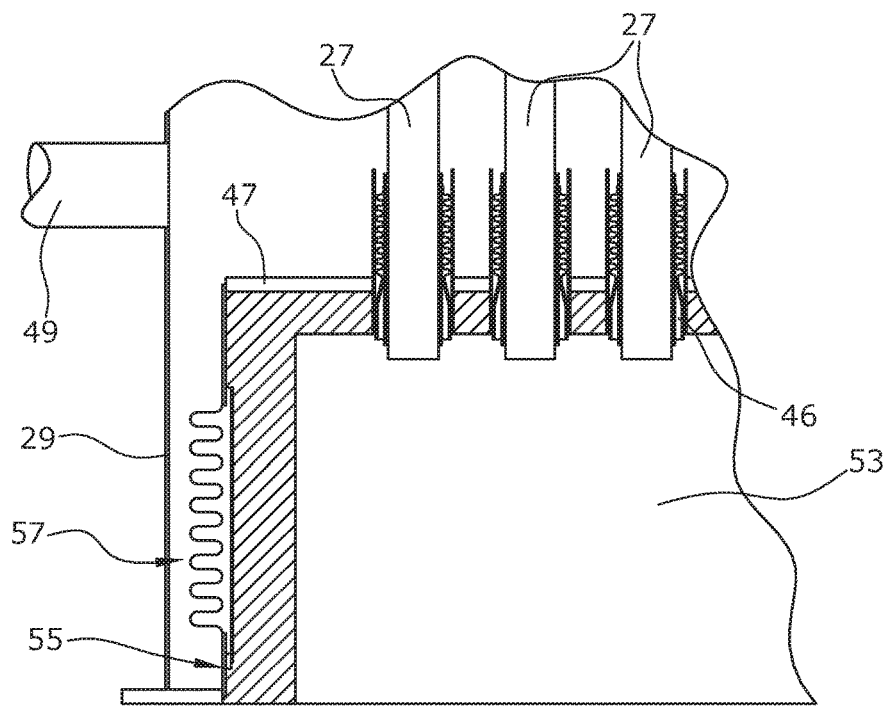

The invention will be explained in greater detail hereunder with reference to the accompanying Figures, wherein FIG. 1 is a schematic view illustrating the principal configuration of a carbon black production plant according to the invention, FIG. 2 is a schematic lateral view of the heat exchange system of a carbon black production plant according to the invention, FIG. 2A is a schematic detailed view of a first tube with a first casing tube of the first heat exchange section of the heat exchange system according to FIG. 1, FIG. 3A is a schematic detailed view of the second upper tube plate and the second tubes of the second heat exchange section of the heat exchange system according to FIG. 1, and FIG. 3B is a schematic detailed view of the second lower tube plate and a second tube of the second heat exchange section of the heat exchange system according to FIG. 2.

FIG. 1 illustrates the principal configuration of a carbon black production plant 100 according to the invention. The carbon black production plant substantially consists of a reactor 102, a heat exchange system 1 and a separation device 104.

In said reactor 102, an incomplete burning takes place, resulting in the generation of flue gas. The flue gas is supplied via a tube conduit system 106 to the heat exchange system 1. Via a second tube conduit system 106, the flue gas that has been cooled in the heat exchange system 1 is supplied to separation device 104 in which the carbon black and the gas will be separated.

The heat exchange system 1 is further supplied with reaction air. The reaction air is preheated via the heat exchange system 1 and then will be supplied as preheated reaction air to the reactor. In FIG. 1, the flow direction of the reaction air is represented by corresponding arrows, with arrow A denoting the inflow of the reaction air and arrow B denoting the outflow of the reaction air. Further, a second fluid is supplied to the heat exchange system 1. Also this fluid will be preheated in the heat exchange system 1 and be led off as a heated fluid. The fluid can be e.g. water, wherein the heated water will be led off from the heat exchange system 1 in a vaporous state. By means of the heat exchange system 1, the flue gas is cooled, thereby enhancing the completion of the reaction. The inflow of the fluid is represented by arrow C. The outflow of the fluid is represented by arrow D.

Thus, the carbon black production plant 100 according to the invention has the advantage that, on the one hand, by the supply of preheated reaction air, the thermal efficiency of the reaction in reactor 102 can improved. On the other hand, the thermal energy contained in the generated flue gas can be additionally used for heating the fluid, e.g. for vaporization of water. The generated steam can be supplied e.g. to a separate super-heater and thus be used in a conventional water-steam cycle in order to generate electric power. The generated steam can also be used for other purposes.

In FIG. 2, the heat exchange system 1 of the carbon black production plant 100 of FIG. 1 is schematically shown in greater detail.

The heat exchange system 1 consists of a first heat exchange section 3 and a second heat exchange section 4. In said first heat exchange section 3, the fluid will be heated. In said second heat exchange section 4, the reaction air will be preheated.

For this purpose, the first heat exchange section 3 is designed as a double-tube heat exchanger 5. The double-tube heat exchanger 5 comprises a plurality of first tubes 7, as most clearly shown in the detailed view depicted in FIG. 2A. Each of said first tubes 7 is arranged in a single-path configuration in a first casing tube 9.

The double-tube heat exchanger is arranged in a vertical orientation, and the flue gas will be supplied to it at its lower end. For this purpose, the double-tube heat exchanger 5 comprises a first entry chamber 11. The first tubes 7 are connected to the first entry chamber 11. A first lower tube plate 13 delimits said entry chamber 11, wherein this first lower tube plate 13 accommodates the first tubes 7.

On the upper end of the first tubes 7, a first upper tube plate 15 is arranged. The first upper tube plate 15 accommodates the upper ends of the first tubes 7. Adjoining the first upper tube plate 15, a collector tube 17 for the flue gas is arranged.

The flue gas entering the first entry chamber 11 will be distributed among the tubes 7 and will flow through them. The fluid will be conducted to the casing tubes 9 and will flow into the gap 9a formed between the first tubes 7 and the casing tubes 9.

The first heat exchange section 3 can further comprise a steam drum 19 which serves as a store, distributor and separator of water and steam. The steam drum 19 will be supplied with feed water, as indicated by arrow C. The water will be conducted into at least one inlet chamber, not shown, arranged adjacent to the first lower tube plate 13. Said inlet chamber will distribute the water into the tube casings 9. In each of the upper ends of the tube casings 9, an outlet chamber 21 for the evaporated fluid is formed which will collect the evaporated fluid and return it into the steam drum 19. The evaporated fluid is led off from steam drum 19 as indicated by arrow D. The double-tube heat exchanger 5 is operated in parallel flow. Thereby, in the process of evaporating the fluid, use can be made of a natural circulation so that no additional installations will be required for flow generation, such as e.g. a circulating pump.

It can also be provided that the walls of the outlet chambers 21 are connected to each other and form the first upper tube plate, thus making it possible to omit a separate tube plate.

Generally, the design the outlet chambers 21 and of the inlet chambers can be mirror-inverted so that the inlet chambers can also form the first lower tube plate 13.

The flue gas collected in collector tube 17 is supplied to the second heat exchange section 4 via a tube conduit 23 formed as a bend. The second heat exchange section 4 is designed as a tube-bundle heat exchanger 25. The tube-bundle heat exchanger 25 is again arranged vertically and is designed as a counterflow heat exchanger. The flue gas supplied via tube conduit 23 will thus flow through the tube-bundle heat exchanger 25 in downward direction. The reaction air to be heated will, as indicated by arrows A and B, be fed into a lower section of the tube-bundle heat exchanger 25 and will be led off in an upper portion.

In FIG. 3A, the upper section of the tube-bundle heat exchanger 25 is shown in a detailed representation. The tube-bundle heat exchanger 25 comprises a plurality of second tubes 27 extending in a single-path configuration in a second casing tube 29. Thus, the second casing tube 29 forms a chamber 31 traversed by the second tubes 27.

The tube-bundle heat exchanger 25 is arranged in a suspended manner. For this purpose, the tube-bundle heat exchanger 25 is provided with a holding structure 33 engaging the casing tube 29. The suspended arrangement of the tube-bundle heat exchanger has the advantage that a thermal expansion of the tube-bundle heat exchanger 25 and particularly of the casing tube 29 will occur in a downward direction. Thereby, possible problems caused by different thermal expansion of the double-tube heat exchanger and the tube-bundle heat exchanger will be reduced, thus largely obviating the need for complex compensators on tube conduit 23. Since the tube conduit 23 is conducting flue gas at a high temperature, the tube conduit should be made of high-grade materials. Thus, by omission of further installations, the constructional complexity and the expenses can be distinctly reduced.

The plurality of parallel second tubes 27 are held in a suspended manner by a second upper tube plate 35. For this purpose, each tube is provided with a suspension device 37. Said second upper tube plate 35 delimits a second entry chamber 39 for the flue gas arranged at the upper end of the tube-bundle heat exchanger 25. From said second entry chamber 39, the flue gas will be distributed among the second tubes 27.

Due to the relatively high temperature of the flue gas in the second entry chamber 39, it is provided that the second upper tube plate 35 will be cooled. For this purpose, the second upper tube plate 35 is formed as a double bottom comprising an interior cooling chamber 41. The cooling chamber 41 is supplied, via a plurality of cooling fluid inlets 45, with a cooling fluid such as e.g. cool air. Via a cooling fluid outlet 43, the cooling fluid is allowed to exit from cooling chamber 41. The cooling fluid can be e.g. air which via said cooling fluid outlet 43 will be admixed to the reaction air.

By the suspended arrangement of the second tubes 27 on the second upper tube plate 35, it is also accomplished that an expansion of the second tubes 27 can occur in a downward direction.

To compensate for thermal expansion of the second tubes 27, each second tube 27 is provided with an individual tube compensator 46. The latter can be seen in FIG. 3B which is a detailed view of a lower section of the tube-bundle heat exchanger 25. The lower ends of the second tubes 27 are accommodated in a second lower tube plate 47, wherein the individual tube compensators 46 form a connection between the second tubes 27 and the second lower tube plate 47.

The reaction air is supplied via an inlet 49 into the space 31 enclosed by casing tube 29. After passing through the tube-bundle heat exchanger 25, the reaction air will be led off via an outlet 51. The second lower tube plate 47 delimits a further collector chamber 53 for the flue gas. The wall 55 delimiting said further collector chamber 53 is provided with a main compensator 57 which guarantees that, in case of strong expansion of one or a plurality of second tubes 27 or failure of an individual tube compensator 46, a length compensation can occur between the tubes 27 and the casing tube 29. In such a situation, one or a plurality of second tubes 27 can press the second lower tube plate 47 downwards, this movement being accommodated by the main compensator 57.

By the vertical arrangement of the first and second heat exchange sections 3,4 and the additional connection of the double-tube heat exchanger 5 to the tube bundle at the respective upper end, the first and second heat exchange sections 3,4 can be positioned very closely to each other so that the space requirement of the heat exchange system 1 in the carbon black production plant 100 will be relatively low.

The invention claimed is:

1. A carbon black production plant comprising:
at least one reactor for producing a flue gas and comprising a heat exchange system having a first heat exchange section for heat exchange between the flue gas and a fluid and a second heat exchange section for heat ex-change between the flue gas and reaction air for the reactor,
wherein the reaction air can be preheated by the second heat ex-change section,
wherein said first heat exchange section is designed as a double-tube heat exchanger comprising first tubes each arranged in a single-path configuration in a respective first casing tube, and wherein said second heat exchange section is designed as a tube-bundle heat exchanger comprising a tube bundle which is arranged in a second casing tube and which includes second tubes each arranged in a single-path configuration in the casing tube, said first and second tubes being adapted to have the flue gas flow through them,
wherein said double-tube heat exchanger and said tube-bundle heat exchanger are arranged vertically, wherein the respective upper ends of the first and second tubes are connected to each other via a tube conduit, the flue gas flowing through the double-tube heat exchanger is an ascending direction and through the tube-bundle heat ex-changer in a descending direction.

2. The carbon black production plant of claim 1, wherein the double-tube heat exchanger is designed as a natural circulation steam generator.

3. The carbon black production plant of claim 2, wherein the double-tube heat exchanger comprises a vertically standing first entry chamber for the flue gas that has connected to it the first tubes and is delimited by a first lower tube plate accommodating the first tubes.

4. The carbon black production plant of claim 3, wherein, adjacent to the first lower tube plate, at least one inlet chamber for the fluid is arranged that has the first casing tubes connected to it.

5. The carbon black production plant of claim 1, wherein the tube-bundle heat exchanger is designed as a counterflow heat exchanger.

6. The carbon black production plant of claim 1, wherein the tube-bundle heat exchanger is arranged in a suspended manner.

7. The carbon black production plant of claim 1, wherein the tube-bundle heat exchanger comprises a vertically arranged second entry chamber for the flue gas, said chamber being arranged in an upper end section of the tube-bundle heat exchanger, having the second tubes connected thereto and being delimited by a second upper tube plate accommodating the second tubes.

8. The carbon black production plant of claim 7, wherein the tube-bundle heat exchanger comprises a vertically arranged second entry chamber for the flue gas, said chamber being arranged in an upper end section of the tube-bundle heat exchanger, having the second tubes connected thereto and being delimited by a second upper tube plate accommodating the second tubes.

9. The carbon black production plant of claim 8, wherein a second lower tube plate accommodates the lower ends of the second tubes, wherein the second tubes each comprise individual tube compensators for connection with the second lower tube plate.

10. The carbon black production plant of claim 9, wherein an inlet for the reaction air is arranged adjacent to the second lower tube plate, and/or an outlet for the reaction air is arranged adjacent to the second upper tube plate.

\* \* \* \* \*